United States Patent [19]

Matsumoto et al.

[11] Patent Number: 5,265,657
[45] Date of Patent: Nov. 30, 1993

[54] PORTABLE ELECTRIC ROUTER

[75] Inventors: Kihachirou Matsumoto; Junichi Suzuki, both of Katsuta, Japan

[73] Assignee: Hitachi Koki Co., Ltd., Tokyo, Japan

[21] Appl. No.: 18,527

[22] Filed: Feb. 17, 1993

[30] Foreign Application Priority Data

Apr. 10, 1992 [JP] Japan .................. 4-22712[U]
Sep. 16, 1992 [JP] Japan .................. 4-246228

[51] Int. Cl.$^5$ .................. B23C 1/20; B27M 1/00
[52] U.S. Cl. .................. 144/134 D; 144/136 C; 144/371; 409/182
[58] Field of Search .......... 144/134 R, 134 D, 136 R, 144/136 C, 371; 409/178, 182

[56] References Cited

U.S. PATENT DOCUMENTS

| | | | |
|---|---|---|---|
| 2,943,654 | 7/1960 | Emmons | 144/134 D |
| 3,212,541 | 10/1965 | Burrows et al. | 144/134 D |
| 3,289,718 | 12/1966 | Willis | 144/136 C |
| 3,494,395 | 2/1970 | Graham | 144/134 D |
| 4,615,654 | 10/1986 | Shaw | 144/136 C |

*Primary Examiner*—W. Donald Bray
*Attorney, Agent, or Firm*—Sughrue, Mion, Zinn, Macpeak & Seas

[57] ABSTRACT

A portable electric router having a housing supporting within it a motor on whose shaft is fixed a chuck for fixing in place a rotary cutting bit. A base is provided for fixing an axial position of the housing. A guide plate having a guide surface in contact with the workpiece is fixed to the base for guiding the rotary cutting bit over the workpiece. Further, a radially protruding handle is fixed to the base for slidingly moving the guide plate. The guide plate has an extension section extending immediately below the handle and whose bottom surface is flush with the guide surface. Alternatively, a bottom surface of the handle is flush with the guide surface.

7 Claims, 8 Drawing Sheets

PORTABLE ELECTRIC ROUTER

BACKGROUND OF THE INVENTION

The present invention relates to a portable electric router having a guide plate that slides over the surface of a workpiece.

An example of a conventional portable electric router is shown in FIG. 1. A housing 1 is provided for protecting and supporting within it a motor (not shown). The motor has a motor shaft (not shown) to which a rotary cutting bit (not shown) is fixed in place by means of a collet chuck 5. Further, a base 2 is provided for adjustably fixing the vertical position of the housing 1. A generally D-shaped handle 3 is fixed to one side of the base 2 by screws 16. A guide plate 4 is provided below the base 2 for slidingly moving the thus constructed router over a workpiece surface (not shown).

Such a conventional portable electric router is easy to handle because the handle 3 extends in collinear relation to the traveling direction of the rotary cutting bit. For this reason such portable electric routers can be operated with one hand. However, in such conventional portable router, it would be rather difficult to firmly depress the guide plate 4 onto the workpiece surface in intimate surface to surface contact relation due to the single-handed operation in comparison with other woodworking tools such as a portable electric circular saw shown in FIG. 3.

FIG. 4 shows the process involved when the portable electric circular saw shown in FIG. 3 cuts into a workpiece 8. A circular blade 7 rotates in a direction indicated by an arrow B. In this cutting, the workpiece 8 is urged toward a guide plate 4 because of a reaction force produced by virtue of the cutting operation. Therefore, cutting can be stably performed regardless of the size of surface area at which the guide plate 4 contacts the workpiece 8 and regardless of the absence or existence of the guide plate 4 beneath the handle 3.

In contrast, as is shown in FIG. 5, the rotary cutting bit 7 of the conventional portable electric routers rotates in the direction indicated by an arrow C. A reactionary force produced by the rotary cutting bit 7 cutting into the workpiece 8 must be overcome by contact resistance between the workpiece 8 and the guide plate 4 and by an operator's hand forcing the router toward the workpiece 8, since the workpiece is normally held immovable. Therefore, the size of surface area where the guide plate 4 contacts the workpiece 8 is extremely important to the stable operation of portable electric routers.

Ensuring proper contact of the guide plate 4 with the workpiece 8 necessitates applying downward pressure to the handle 3. However, as is shown in FIG. 1, with the conventional portable routers, a distance L separates the handle 3 from the workpiece 8. Pressing downward on the handle 3 to facilitate intimate contact of the guide plate 4 with the workpiece 8 sometimes causes the handle 3 to move downward in a direction A. As the handle 3 moves downward, the rotary cutting bit 7 rises, sometimes causing unintentional routing of a surface of the workpiece 8 as it rises. Such unintentional routing can damage or ruin the workpiece 8 which may be made from expensive materials. This problem has been especially frequent in routing of narrow width workpiece 8 such as shown in FIG. 6.

To solve this problem there is known a portable electric router as shown in FIG. 2 having an extra wide guide plate 4. Although the extra width of the guide plate 4 provides greater surface area at which the guide plate 4 contacts the workpiece 8, thereby increasing stability of the portable electric router, a new problem has been observed wherein the extra width frustrates routing in areas such as room corners wherein space for maneuvering the portable electric router is limited.

SUMMARY OF THE INVENTION

The present invention is established in an attempt to solve the above described problems, and it is an object of the present invention to provide an improved portable electric router which is capable of performing routing in a stabilized manner and also allowing routing in areas such as room corners wherein space for maneuvering the portable electric router is limited.

These and other objects of the present invention will be attained by providing portable electric router for routing a workpiece including a motor having a motor shaft, a chuck coupled to the motor shaft for fixing a rotary cutting bit to the motor shaft, a housing for supporting therein the motor, a base for adjustably fixing a vertical position of the housing, the base having a lower portion, a guide plate fixed to the lower portion of the base, the guide plate having a first guide surface in surface contact with a surface of the workpiece for guiding the rotary cutting bit therealong, a handle fixed to the base and extending outwardly therefrom, and a handle inclination prevention means for preventing the handle from being inclined during routing operation. The prevention means has a second guide surface flush with the first guide surface of the guide plate, and the second guide surface is positioned exclusively one of under and underside of the handle.

Even if pressure is applied downward on the handle, the existence of the handle inclination prevention means prevents the handle from lowering or inclining during routing. Furthermore, because the handle inclination prevention means does not increase the external diameter of the portable electric router of the present invention, routing can be performed in confined areas such as corners of rooms wherein space for maneuvering is limited.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
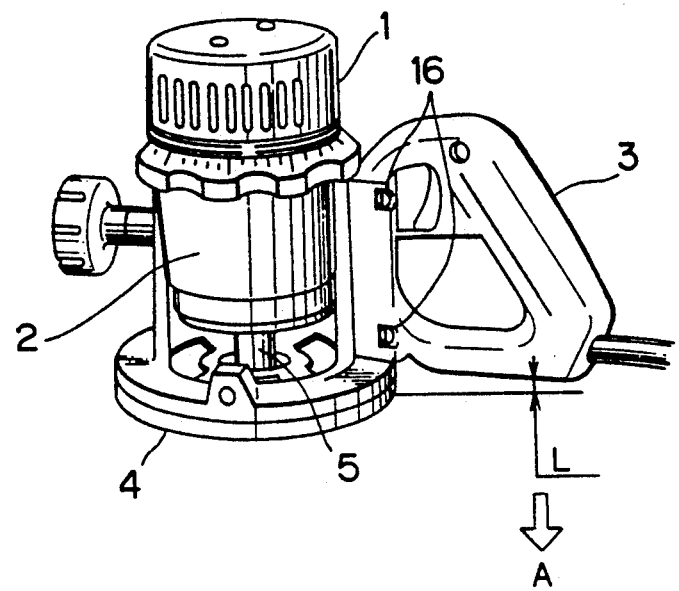
FIG. 1 is a perspective view showing an example of a conventional portable electric router.
Figure 2:
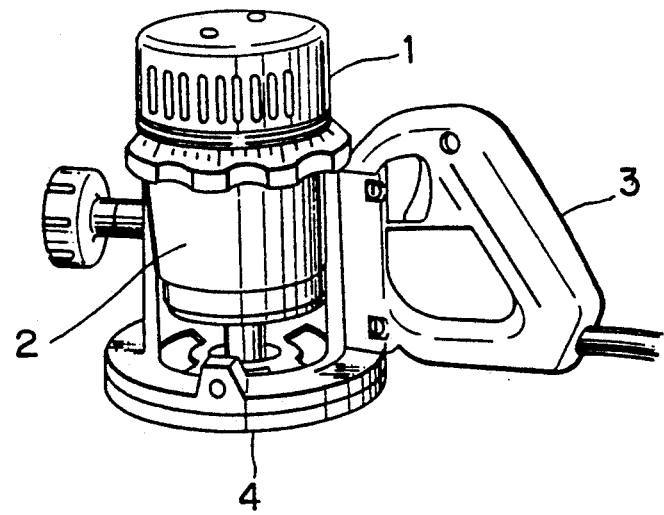
FIG. 2 is a perspective view showing an example of another conventional portable electric router that has an extra wide guide plate.
Figure 3:
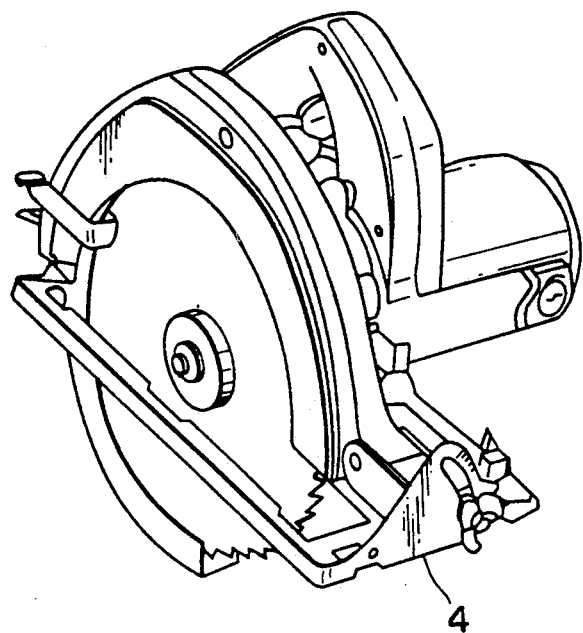
FIG. 3 is a perspective view showing an example of a conventional portable electric circular saw.
Figure 4:
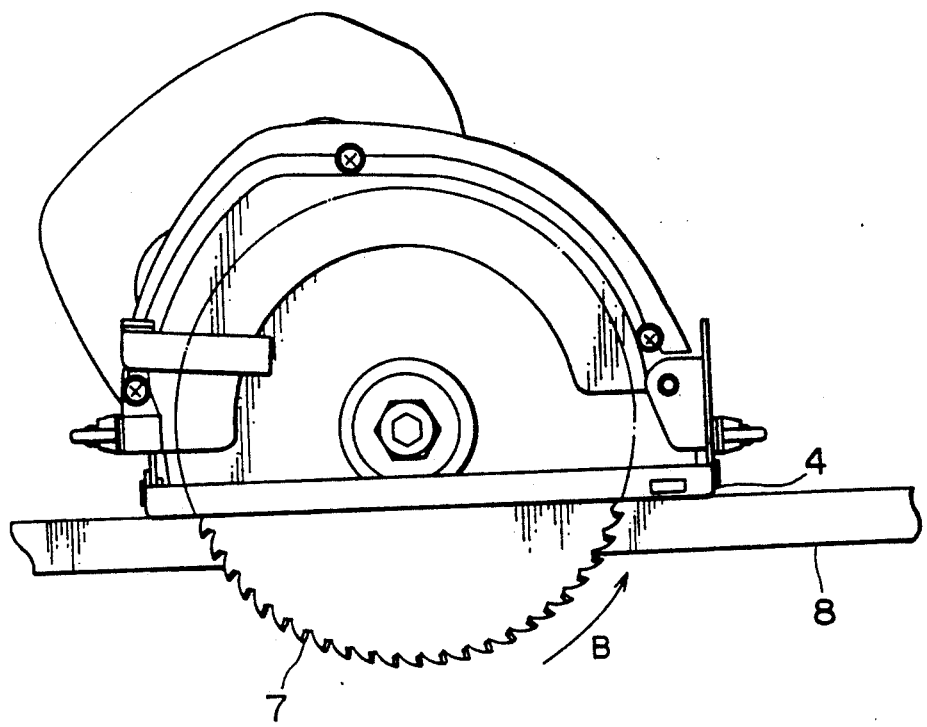
FIG. 4 is a side view showing the cutting operation of the portable electric circular saw of FIG. 3.
Figure 5:
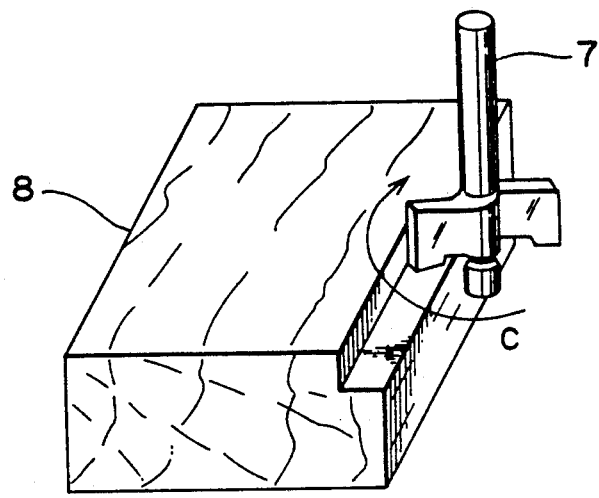
FIG. 5 is a schematic view showing the relationship of a rotary cutting bit of the conventional portable electric router with a workpiece.
Figure 6:
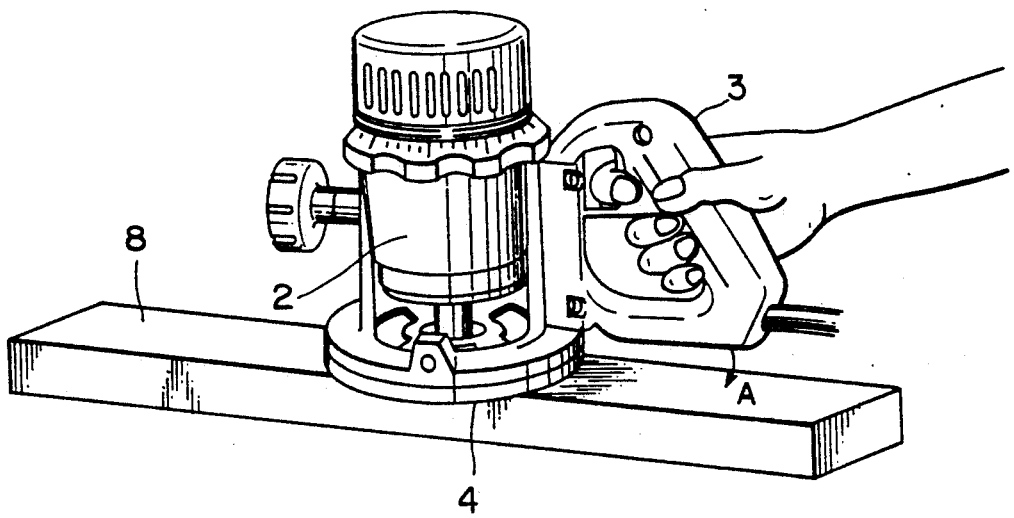
FIG. 6 is a perspective view showing a conventional portable electric router routing a workpiece with a narrow width.

Referring to FIGS. 7 through 17, the following text will describe in detail preferred embodiments of the invention wherein like parts and components are designated by the same reference numerals as those shown in FIGS. 1 through 6 to avoid duplicating description.

A portable electric router according to a first embodiment of the present invention will first be described with reference to FIGS. 7 through 12.

Figure 7:
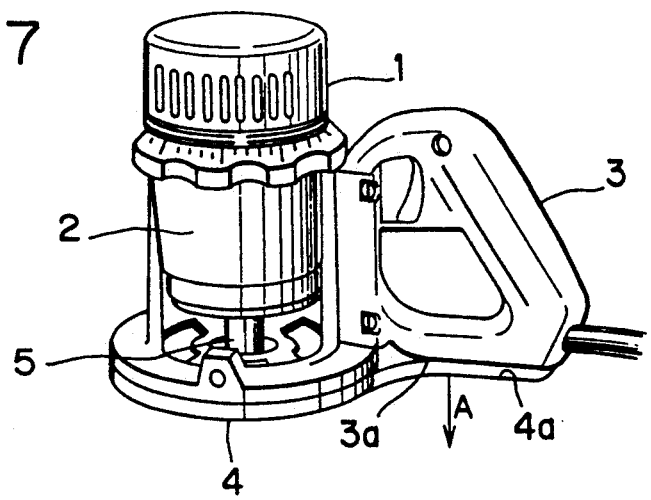
FIG. 7 is a perspective view showing a portable electric router according to a first embodiment of the present invention.
Figure 8:
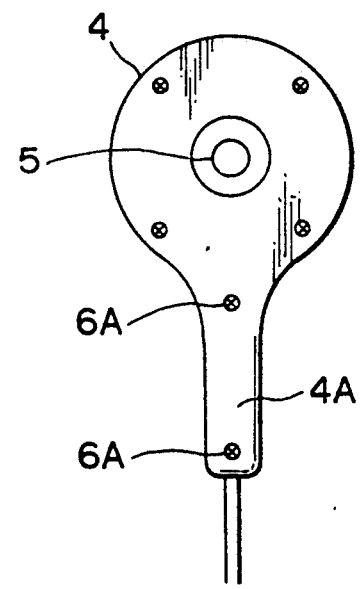
FIG. 8 is a bottom view showing the portable electric router shown in FIG. 7.
Figure 9:
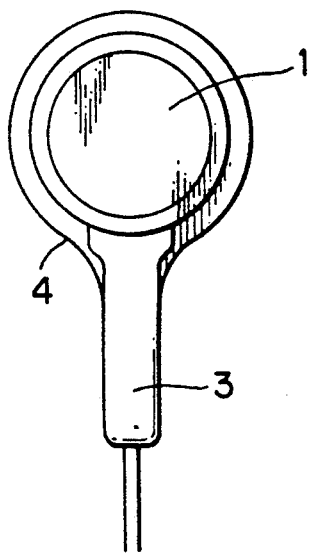
FIG. 9 is a top plan view showing the portable electric router shown in FIGS. 6 and 7.

As best shown in FIGS. 7 through 9, a guide plate 4 disposed below a base 2 has an extension section 4A extending radially outwardly with respect to the guide plate 4 in conformance with a bottom shape of the handle 3. The extension section 4A is provided integrally with the guide plate 4 to form a handle inclination prevention means. A bottom surface of the extension section 4A is flush with that of the guide plate 4. The extension section 4A is fixed by at least one screw 6A to a bottom surface 3a of the handle 3. In other words, the extension section 4A is positioned immediately below the bottom surface 3a of the handle 3 and has a contour substantially identical with that of the bottom surface 3a.

Figure 10:
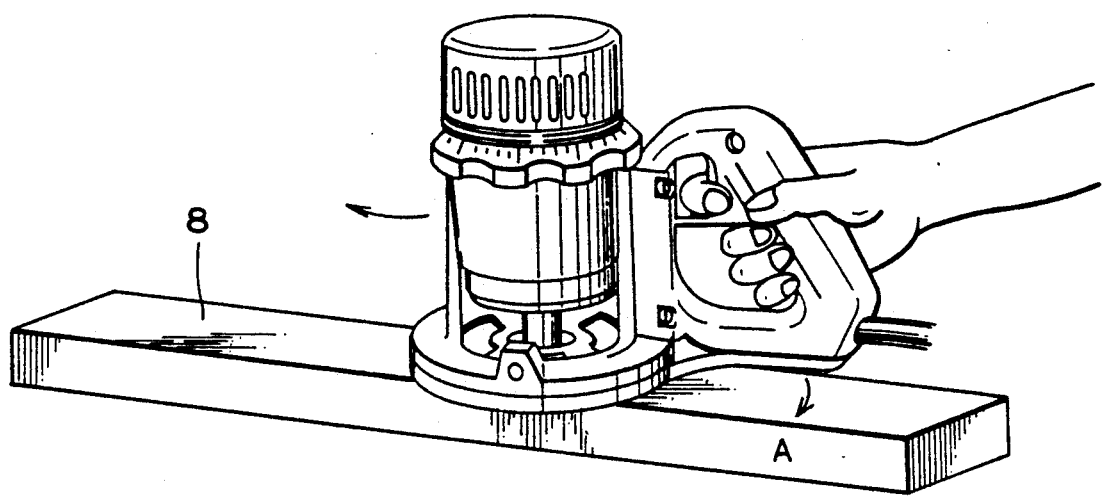
FIG. 10 is a perspective view showing the portable electric router shown in FIG. 7 routing a workpiece with a narrow width.
Figure 11:
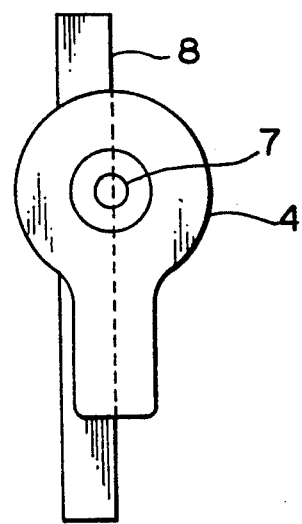
FIG. 11 is a bottom view of the portable electric router shown in FIG. 10.
Figure 12:
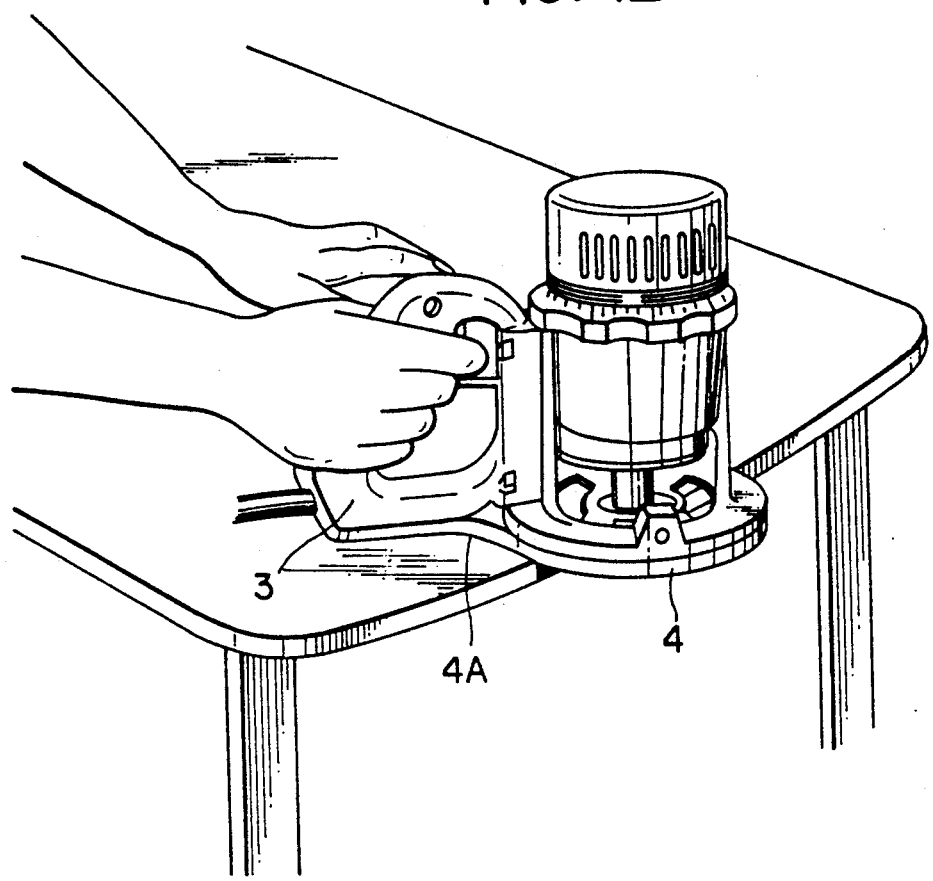
FIG. 12 is a perspective view showing the portable electric router shown in FIG. 7 routing a large workpiece.

With this construction, applying pressure downward to the handle 3 in the direction A will not cause the handle 3 to move downward because of the extension section 4A. Since the handle 3 will not move downward, level of the rotary cutting bit remains stable. Further, keeping the extension section 4A within the perimeter of the workpiece 8 allows stable routing of workpiece 8 with narrow widths as shown in FIGS. 10 and 11 as well as that of larger workpiece 8 such as shown in FIG. 12. Furthermore, because the resultant external diameter of the guide plate 4 remains unchanged, routing can be performed in areas such as room corners wherein space for maneuvering the portable electric router is limited.

Figure 13:
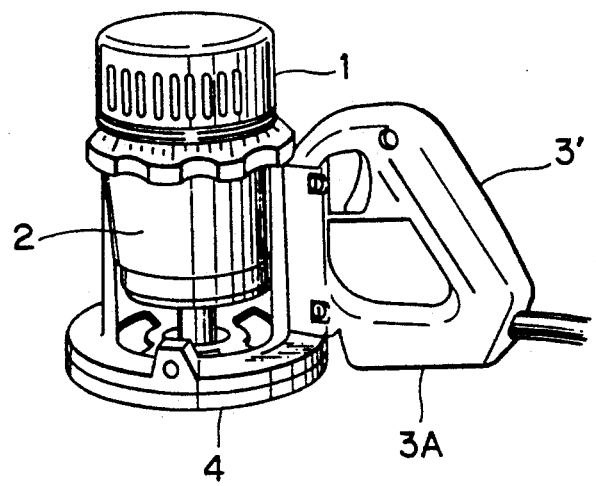
FIG. 13 is a perspective view showing a portable electric router according to a second embodiment of the present invention.
Figure 14:
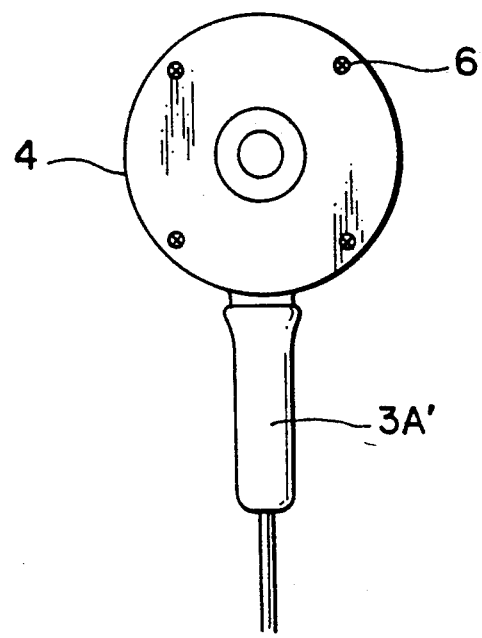
FIG. 14 is a bottom view showing the portable electric router shown in FIG. 13.
Figure 15:
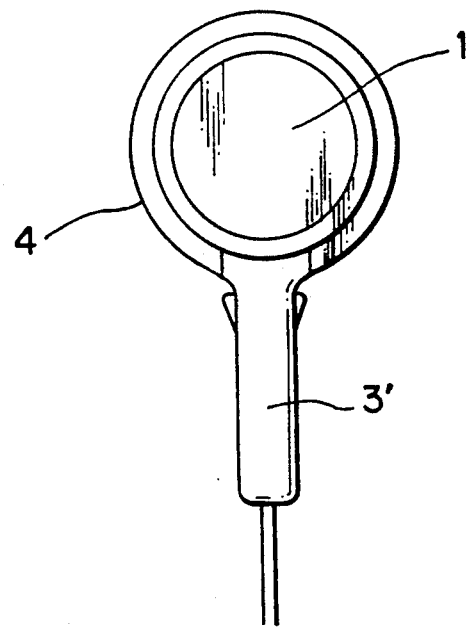
FIG. 15 is a top view showing the portable electric router shown in FIG. 13.

A portable electric router according to a second embodiment of the present invention will next be described with reference to FIGS. 13 through 15.

In the second embodiment, a handle 3' has a downwardly projecting section 3A, so that an under surface 3A' of the handle 3' is flush with the under surface of the guide plate 4. In other words, the handle 3' has an elongated D shape and has a bottom surface flush with the guide surface of the guide plate 4. The downwardly projecting section 3A serves as a handle inclination preventing means. In other words, the bottom surface of the handle 3' serves as the prevention means. This construction provides the benefits the same as those of the first embodiment but without necessitating screws 6A shown in FIG. 8 for fixing the guide plate 4 to the handle 3. This reduces the total number of screws required to assemble the portable electric rotor as well as reducing the time required for the assembly procedure, thus reducing parts and labor costs.

Figure 16:
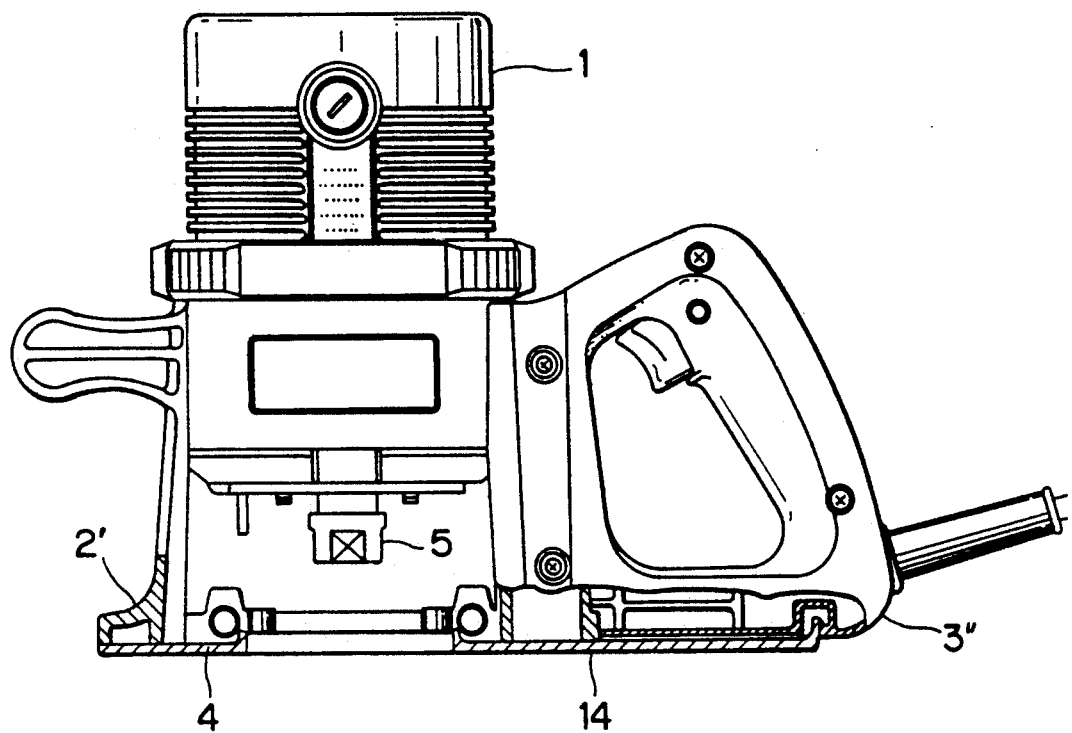
FIG. 16 is a front view partly cross-sectioned showing a router according to a third embodiment of the present invention.
Figure 17:
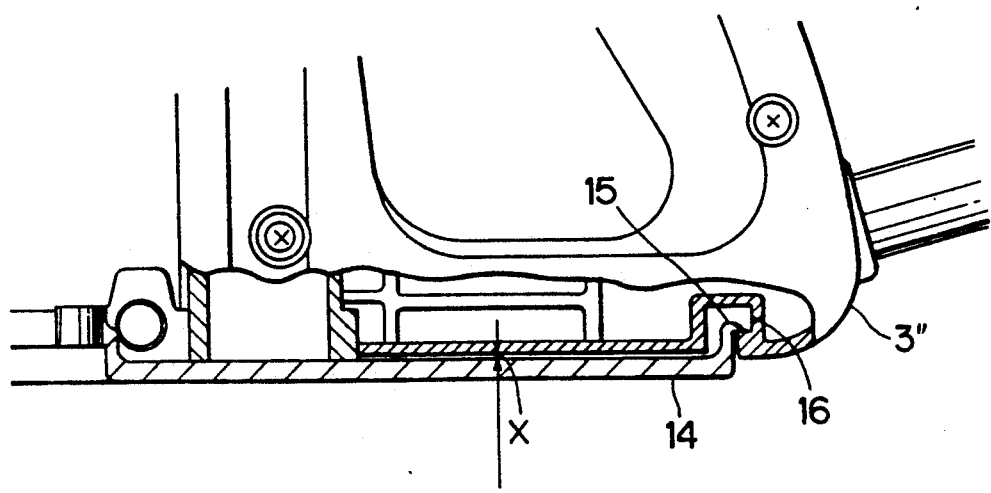
FIG. 17 is a partly enlarged cross-sectional view showing the third embodiment.

A portable electric router according to a third embodiment of this invention will next be described with reference to FIGS. 16 and 17. The third embodiment pertains to an improvement on the first embodiment. Apparently, a surface flatness over the bottom surface of the guide plate 4 and the bottom surface of the extension section 4A is important for guiding travel of the router in the first embodiment. Here, since the guide plate 4 and the extension section 4A are provided integrally, and since these are fixed to the bottom surfaces of the base 2 and the handle 3 by screws 6A. Therefore, a surface flatness over the bottom surfaces of the base 2 and the handle 3 must be accurately provided in the first embodiment if the guide plate 4 and the extension section 4A have uniform thickness. Alternatively, the bottom surface level of the base 2 and the handle 3 must have a fixed relationship to conform with the thickness of the guide plate 4 and the extension section 4A. Otherwise, flatness over the bottom surface of the guide plate 4 and the extension section 4A may be degraded upon fixing them by the screws 6A. In order to align the bottom surface level between the base 2 and the handle 3 into a proper dimension, these must be reassembled, or replaced, or machined.

In an attempt to overcome this drawback, in the third embodiment, a bottom surface of the handle 3" is positioned slightly higher than a bottom surface of the base 2' by a distance X. The bottom surface of the handle 3" is formed with a recess 16. Further, an extension section 14 of a guide plate has an upwardly oriented projection 15 engageable with the recess 16.

Only the circular section of the guide plate 4 is fixed to the bottom surface of the base 2' by screws 6A in a manner similar to a structure shown in FIG. 8. However, the extension section 14 is engaged or hooked with the bottom surface of the handle 3" by the engagement between the recess 16 and the projection 15. In other words, no screws 6A are used for fixing the extension section 14 to the handle bottom. Accordingly, resultant guide plate 4 and the extension section 14 has a flat bottom surface regardless of the high dimensional accuracy of the bottom surface level of the base 2" and the handle 3'.

In view of the foregoing, according to the portable electric router of the present invention, stable performance of routing is made possible by radially elongating the section of the guide plate nearest the handle outward to the extent the handle radially projects outward (by providing the handle inclination preventing means 4A) or by elongating the lower section of the handle so that its under surface is flush with that of the guide plate (by providing the handle inclination preventing means 3A). With such a portable electric router, one-handed operation can be performed without fear of the handle lowering during operation. Furthermore, because the external diameter of guide plate does not increase, routing can be performed in areas such as corners of rooms wherein space for maneuvering is limited.

While the invention has been described in detail with reference to specific embodiments thereof, it would be apparent to those skilled in the art that various changes and modifications may be made therein without departing from the spirit and scope of the invention.

What is claimed is:

1. A portable electric router for routing a workpiece comprising:
   a motor having a motor shaft;
   a chuck coupled to the motor shaft for fixing a rotary cutting bit to the motor shaft;
   a housing for supporting therein the motor;
   a base for adjustably fixing a vertical position of the housing, the base having a lower portion;
   a guide plate fixed to the lower portion of the base, the guide plate having a first guide surface in surface contact with a surface of the workpiece for guiding the rotary cutting bit therealong;
   a handle fixed to the base and extending outwardly therefrom; and
   handle inclination prevention means for preventing the handle from being inclined during routing operation, the prevention means having a second guide surface flush with the first guide surface of the guide plate, and the second guide surface being exclusively positioned one of under and underside of the handle.

2. The portable electric router as claimed in claim 1, wherein the handle inclination prevention means comprises an extension section extending from the guide plate and provided integrally therewith, the extension section having a lower surface serving as the second guide surface.

3. The portable electric router as claimed in claim 2, wherein the extension section is positioned immediately below a bottom surface of the handle and has a contour substantially identical with that of the bottom surface.

4. The portable electric router as claimed in claim 3, wherein the extension section and the guide plate are fixed to the handle and the base, respectively by screws.

5. The portable electric router as claimed in claim 1, wherein the handle has an elongated D shape and has a bottom surface flush with the first guide surface, the bottom surface of the handle serving as the prevention means.

6. The potable electric router as claimed in claim 2, wherein a bottom surface of the handle is positioned slightly higher than a bottom surface of the base,
   and wherein the bottom surface of the handle is formed with a recess,
   and wherein the extension section is provided with an upwardly oriented projection engageable with the recess.

7. The portable electric router as claimed in claim 6, wherein the only a circular section of the base plate is fixed to the bottom surface of the base by screws, and wherein the extension section is fixed to the bottom surface of the handle by the engagement between the recess and the projection, whereby flatness between the first and second guide surfaces is ensured.

* * * * *